United States Patent [19]

Yamaki et al.

[11] Patent Number: 5,417,625
[45] Date of Patent: May 23, 1995

[54] CONTROL SYSTEM FOR ENGINE HAVING DUAL THROTTLES WITH HOLD DURING A SHIFT FOR AN AUTOMATIC TRANSMISSION WITH THE ELECTRIC THROTTLED CONTROLLED BY PATTERNS BASED IN THE MECHANICAL THROTTLE, ENGINE SPEED AND GEAR SPEED

[75] Inventors: Yasushi Yamaki; Toshinori Higashi, both of Hiroshima, Japan

[73] Assignee: Mazda Motor Corporation, Hiroshima, Japan

[21] Appl. No.: 141,356

[22] Filed: Oct. 28, 1993

Related U.S. Application Data

[63] Continuation of Ser. No. 903,032, Jun. 23, 1992, abandoned.

[30] Foreign Application Priority Data

Jun. 26, 1991 [JP] Japan .................. 3-154494
Oct. 3, 1991 [JP] Japan .................. 3-256290

[51] Int. Cl.$^6$ .................. B60K 41/10; F16H 61/04
[52] U.S. Cl. .................. 477/109; 477/106; 477/110
[58] Field of Search .................. 74/866; 364/424.1; 477/107, 109, 110, 101, 105

[56] References Cited

U.S. PATENT DOCUMENTS

| | | | |
|---|---|---|---|
| 4,266,447 | 5/1981 | Heess et al. | 74/852 X |
| 4,355,550 | 10/1982 | Will et al. | 74/858 X |
| 4,403,527 | 9/1983 | Mohl et al. | 74/851 |
| 4,800,781 | 1/1989 | Yasue et al. | 74/851 X |
| 4,823,645 | 4/1989 | Gaus et al. | 74/872 X |
| 4,933,851 | 6/1990 | Ito et al. | 74/858 X |
| 5,036,728 | 8/1991 | Kawasoe et al. | 74/858 |
| 5,038,287 | 8/1991 | Taniguchi | 74/851 X |
| 5,101,687 | 4/1992 | Iwatsuki | 74/858 |
| 5,230,256 | 7/1993 | Oizumi et al. | 74/866 |

FOREIGN PATENT DOCUMENTS

| | | |
|---|---|---|
| 1-147130 | 6/1987 | Japan . |
| 62-175226 | 7/1987 | Japan . |
| 2-221658 | 9/1990 | Japan . |

*Primary Examiner*—Dirk Wright
*Assistant Examiner*—Khoi Q. Ta
*Attorney, Agent, or Firm*—Keck, Mahin & Cate

[57] ABSTRACT

A control system for an automobile engine equipped with an automatic transmission has an intake air controller, such as an electric throttle valve, controlling intake air introduced into the engine according to control patterns which are predetermined for various gears of the automatic transmission. The control system interrupts the control of intake air introduction according to a control pattern corresponding to a desired gear to which the automatic transmission should be shifted up to during an up-shift operation to the desired gear. During a down-shift operation, the control system causes the output torque controller to start the control of output torque according to the control pattern corresponding to a desired gear to which the automatic transmission should be shifted down to simultaneously with a drop of engine output torque.

14 Claims, 14 Drawing Sheets

CONTROL SYSTEM FOR ENGINE HAVING DUAL THROTTLES WITH HOLD DURING A SHIFT FOR AN AUTOMATIC TRANSMISSION WITH THE ELECTRIC THROTTLED CONTROLLED BY PATTERNS BASED IN THE MECHANICAL THROTTLE, ENGINE SPEED AND GEAR SPEED

This is a continuation of application Ser. No. 07/903,032, filed Jun. 23, 1992, now abandoned.

BACKGROUND OF THE INVENTION

1. Field of the Invention

The present invention relates to a control system for an engine equipped with an automatic transmission.

2. Description of Related Art

Typically, an automobile engine has an output control means, such as a throttle valve, which may be mechanical and which is controlled by an accelerator pedal through a mechanical linkage. Since such mechanical throttle valves change their openings in almost fixed or proportional relations with respect to displacement of accelerator pedals, they disable engines with mechanical throttle valves from changing their outputs according to engine operating conditions. On the other hand, a mechanical throttle valve inherently provides a large change in the quantity of intake air admitted into an engine during a small displacement of the accelerator pedal but quite a small change in this quantity of intake air during a large displacement of the accelerator pedal. Accordingly, displacing the accelerator pedal beyond a certain, fairly large extent causes no effective change in the quantity of intake air admitted into the engine, and does not provide a favorable increase in engine output.

To provide a greater flexibility in engine output control, there has been proposed an electrically controlled or motor operated throttle valve device (which is hereafter referred to as an electric throttle valve for simplicity), in which an electric actuator is driven by an electric signal representative of the displacement of the accelerator pedal so as to control the quantity of intake air admitted into the engine. Such an electric throttle valve is able to flexibly change its opening relative to the displacement of the accelerator pedal by electrically processing the electric signal. With electric throttle valves, the flexibility of output control of engines has been improved. One such electric throttle valve is known from, for instance, Japanese Unexamined Patent Publication No. 2-221,658.

In order to improve output characteristics of a power plant, including an engine and an automatic transmission, an electric throttle valve of this kind is designed and adapted to operate in different throttle opening control patterns according to shifted gears of the automatic transmission. To provide favorable power plant output and a decreased difference in power plant output before and after gear shifting, such an electric throttle valve is designed so that its opening changes to a larger degree for higher gears, in which drive power of the power plant is lowered, than for lower gears. As will become clear, this is shown in FIG. 3. However, changing from one throttle opening control pattern to another upon an up-shift operation of the automatic transmission causes a rapid increase in throttle opening. This is accompanied by a rapid increase in drive power of the power plant, and results in what is known as "shift shock."

When the throttle opening control pattern is changed upon a down-shift operation of the automatic transmission, vehicle acceleration plummets at the beginning of the down-shift operation. This is known as "acceleration slump." When an accelerator pedal is depressed for acceleration and a down-shift operation of the automatic transmission takes place, the gear mechanism of the automatic transmission is temporarily brought into an idling condition. This decreases an engine torque transmitted to driving wheels from the power plant, and leads to a deterioration in drive feeling or shift quality during a down-shift.

SUMMARY OF THE INVENTION

It is an object of the present invention to provide a control system for an automobile engine equipped with an automatic transmission which prevents an occurrence of shift shocks during an up-shift operation of the automatic transmission due to throttle opening control pattern replacement.

It is another object of the present invention to provide a control system for an automobile engine equipped with an automatic transmission which prevents an occurrence of acceleration slump during a down-shift operation of the automatic transmission.

The above objects of the present invention are accomplished by providing a control system for an automobile engine equipped with an automatic transmission which has an intake air control means, such as an electric throttle valve, for performing a control of intake air introduction into the engine according to control patterns which are predetermined for possible gears of the automatic transmission. The control system interrupts the control of intake air introduction according to the control pattern corresponding to a desired gear to which the automatic transmission should be shifted up during an up-shift operation of the automatic transmission to the desired gear. The opening of the electric throttle valve is controlled so as to vary the quantity of intake air introduced into the engine according to the control pattern. The control system further causes the output torque of the engine to drop during an up-shift operation of the automatic transmission and releases the interruption of the control of intake air introduction when the drop of engine output torque terminates.

The control system forces the Output torque control means to provide a drop of engine output torque during a down-shift operation of the automatic transmission. During a down-shift, the control system performs a throttle opening control pattern replacement at the beginning of the drop of engine output torque.

Because no replacement of an electric throttle opening control pattern takes place during an up-shift of the automatic transmission, the engine output torque is not significantly varied before the up-shift. This results in an up-shift which is free from shift shocks. Since the drop of engine output torque terminates at the completion of an up-shift of the automatic transmission, when a throttle opening control pattern replacement is conducted at the end of the drop of engine output torque, the engine has lowered its speed sufficiently. Accordingly, the difference in opening of the electric throttle valve before and after an up-shift is sufficiently small to eliminate undesirable shift shocks upon a throttle opening control pattern replacement.

BRIEF DESCRIPTION OF THE DRAWINGS

The above and other objects and features of the present invention will be apparent to those skilled in the art from the following description of preferred embodiments thereof when considered in conjunction with the appended drawings, in which.

DETAILED DESCRIPTION OF THE PREFERRED EMBODIMENTS

Figure 1:
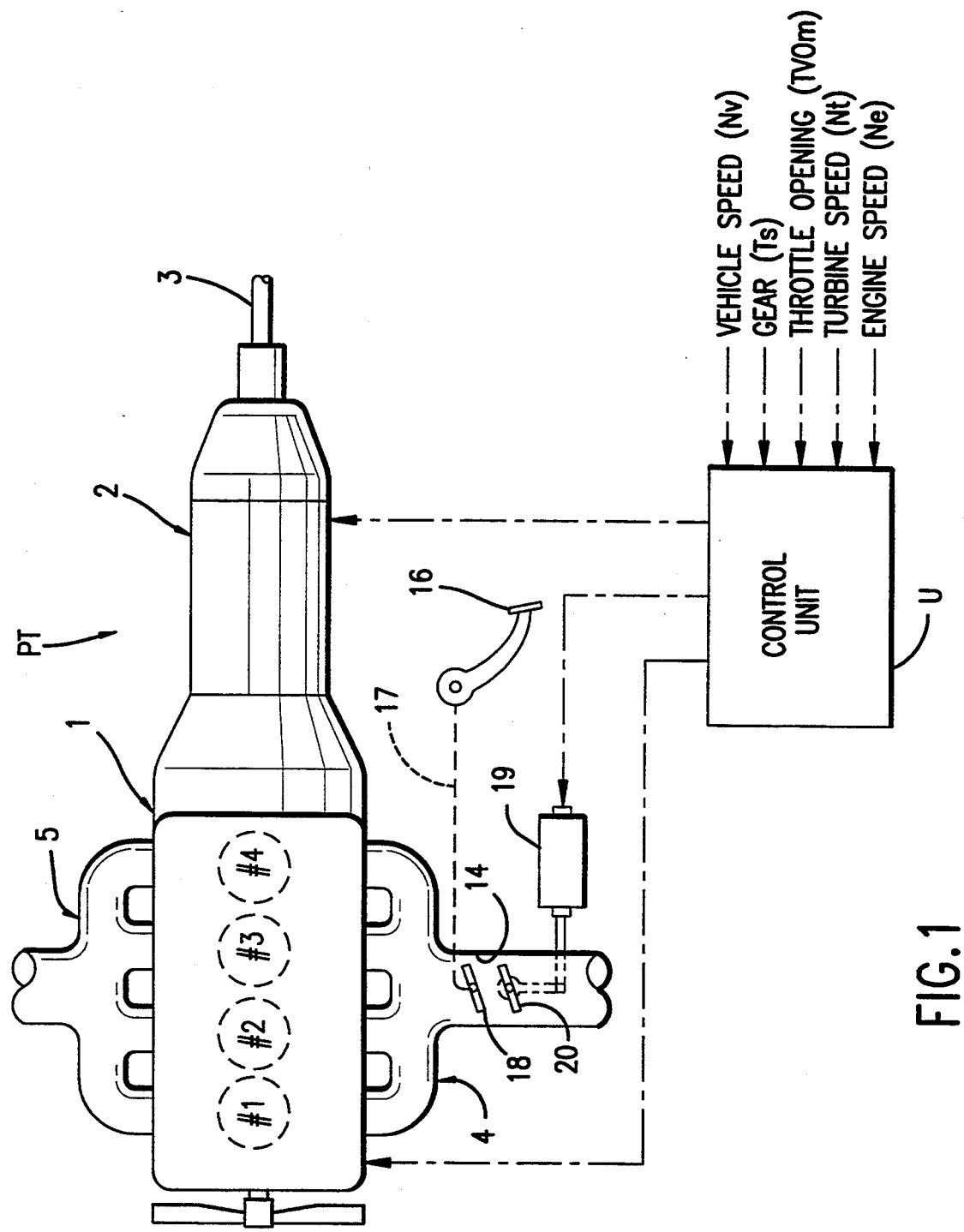
FIG. 1 is a schematic illustration of a power plant for an automotive vehicle which is controlled by a control system in accordance with a preferred embodiment of the present invention.
Figure 2:
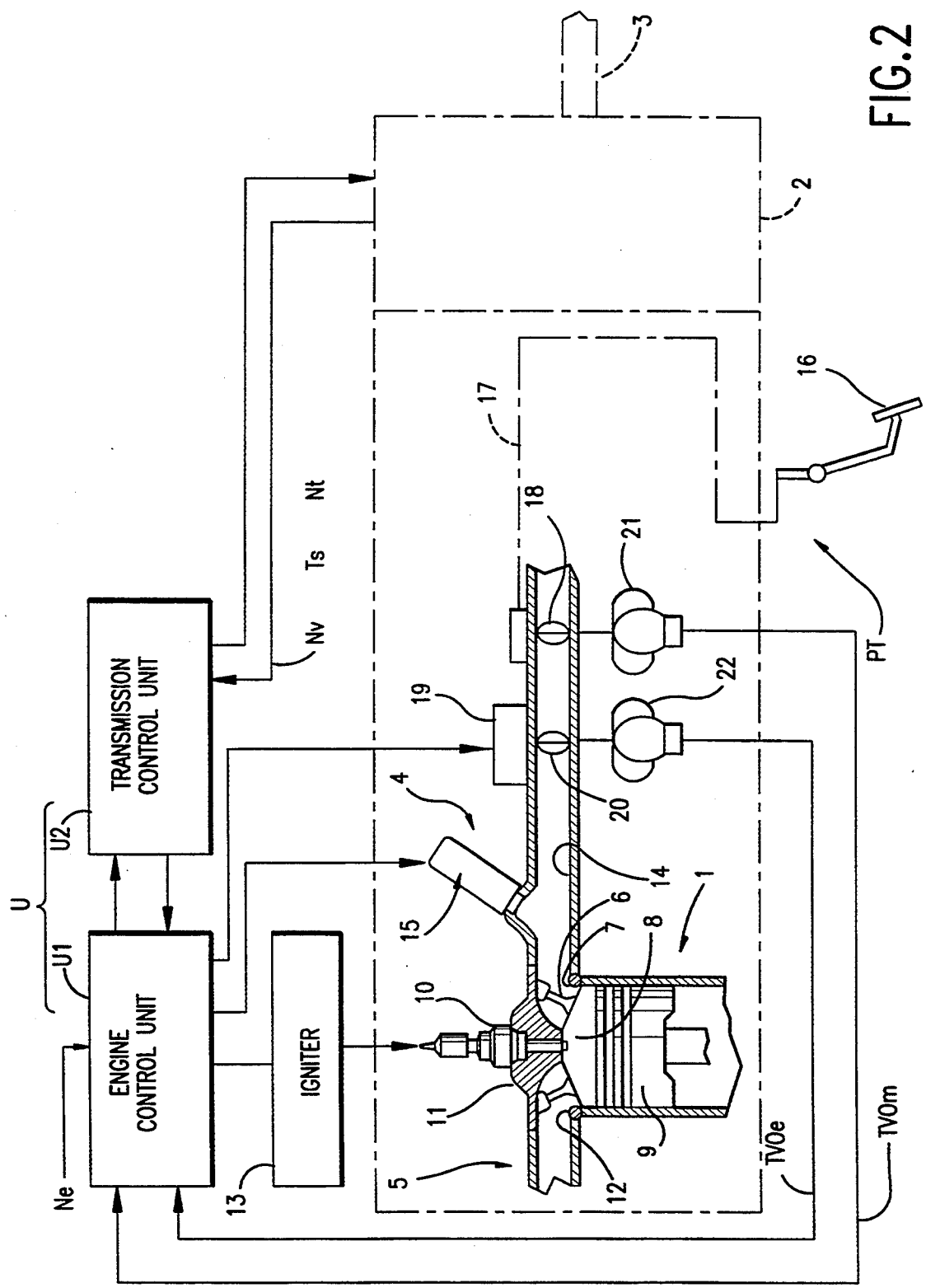
FIG. 2 is a diagrammatic illustration showing a control mechanism for the power plant shown in FIG. 1.
Figure 3:
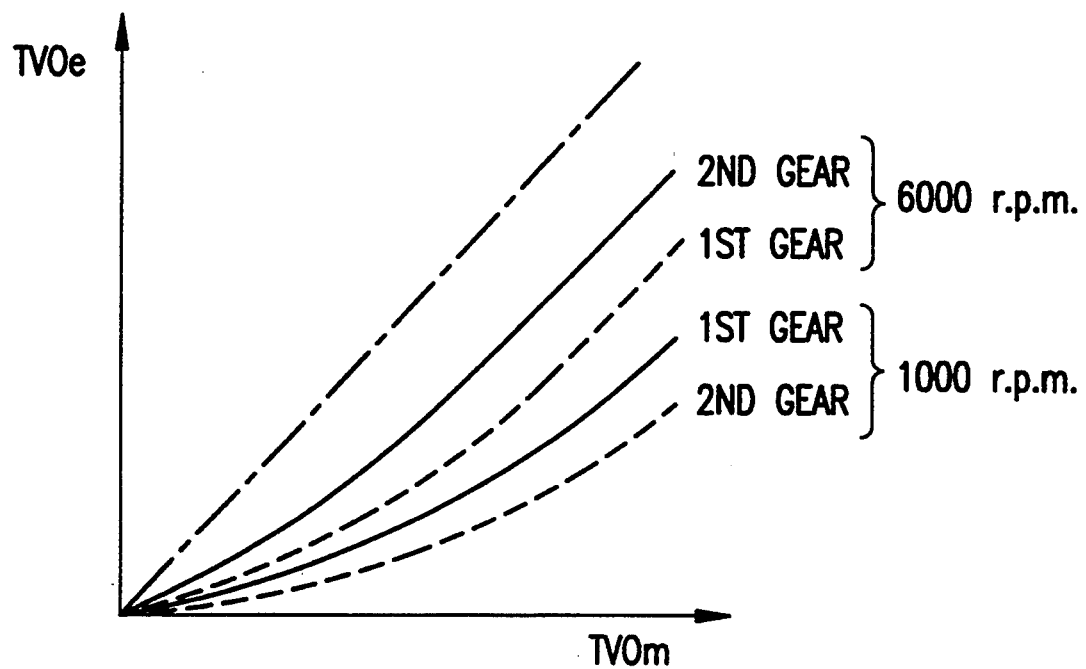
FIG. 3 is a diagram showing an electric throttle opening control map.

Referring to the drawings in detail and, in particular, to FIGS. 1 and 2, an automobile power plant, which is generally indicated by reference characters PT, includes an internal combustion engine 1 and an automatic transmission 2, which are controlled by a control system in accordance with a preferred embodiment of the present invention. The engine has a plurality of cylinders arranged in a row. As shown, four such cylinders, designated #1 to #4, are shown. The engine 1 is coupled to the automatic transmission 2, which is equipped with a torque convertor (not shown). The engine output torque is decreased and increased, and is then transmitted by the automatic transmission to a drive line via a transmission output shaft 3. The engine 1 is equipped with an intake system 4 and an exhaust system 5, both of which are in communication with a combustion chamber 8 formed in each of the cylinders. For each cylinder, the engine is formed with an intake port 7 and an exhaust port 12, which open into the combustion chamber 8 and are opened and shut at a predetermined timing by an intake valve 6 and an exhaust valve 11, respectively. While the intake valve 6 opens the intake port 7, a fuel mixture is introduced into the combustion chamber 8 through the intake system 4. Immediately after the piston compresses the fuel mixture in the combustion chamber 8 during a compression stroke of the engine 1, the fuel mixture is ignited by a spark plug 10 and burned. Burned gases in the combustion chamber 8 are discharged through the exhaust system while the exhaust valve 11 opens the exhaust port 12. An igniter 13 applies electric power at a predetermined timing to the spark plug 10.

Intake system 4 is provided with the same number of individual intake pipes as there are cylinders. The intake pipes individually communicate with respective intake ports 7 of the cylinders. These individual intake pipes are joined together at their upstream ends so as to form a common intake pipe 14. In each individual intake pipe, there is provided an electric fuel injector 15 disposed near the intake port 7. In the common intake pipe 14, there are provided a mechanical throttle valve 18 and an electric throttle valve 20, in order from upstream to downstream. The mechanical throttle valve 18 is operationally coupled to and has its opening mechanically controlled by an accelerator pedal 16 through a mechanical linkage 17. Controlled opening of the mechanical throttle valve 18 is detected by a first throttle sensor 21. The electric throttle valve 20 is operationally coupled and has its opening mechanically controlled by an electric actuator 19, which is electrically driven by an control unit U formed mainly by a microcomputer. Controlled opening of the electric throttle valve 20 is detected by a second throttle sensor 22.

Power plant PT is controlled by means of the control unit U which includes two sub-units interfaced with each other. These sub-units include an engine control unit U1 for controlling the igniter 13, the electric fuel injector 15 and the electric actuator 19, and a transmission control unit U2 for controlling the automatic transmission 2. The engine control unit U1 receives control signals representative of the throttle openings detected by the first and second throttle sensors 21 and 22, a signal representative of engine speed detected in a well known manner, and signals representative of an operating condition of the automatic transmission 2, such as a vehicle speed, a present or "undertaking" gear, a turbine speed, etc., which are transferred from the transmission control unit U2. Such operating conditions of the automatic transmission 2 may detected by any well known sensor or sensors.

Figure 4B:
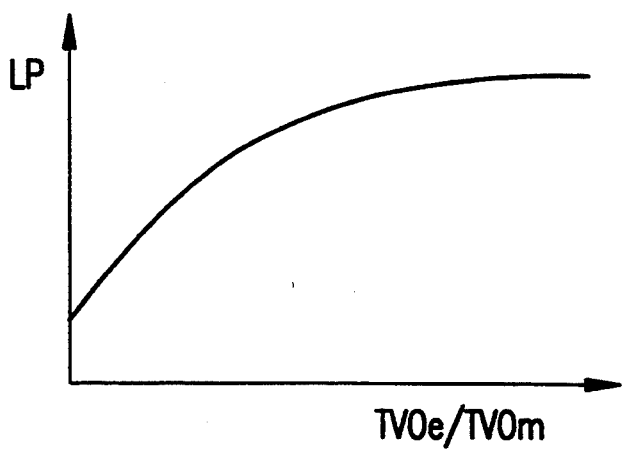
FIG. 4B is a line pressure control map.
Figure 4A:
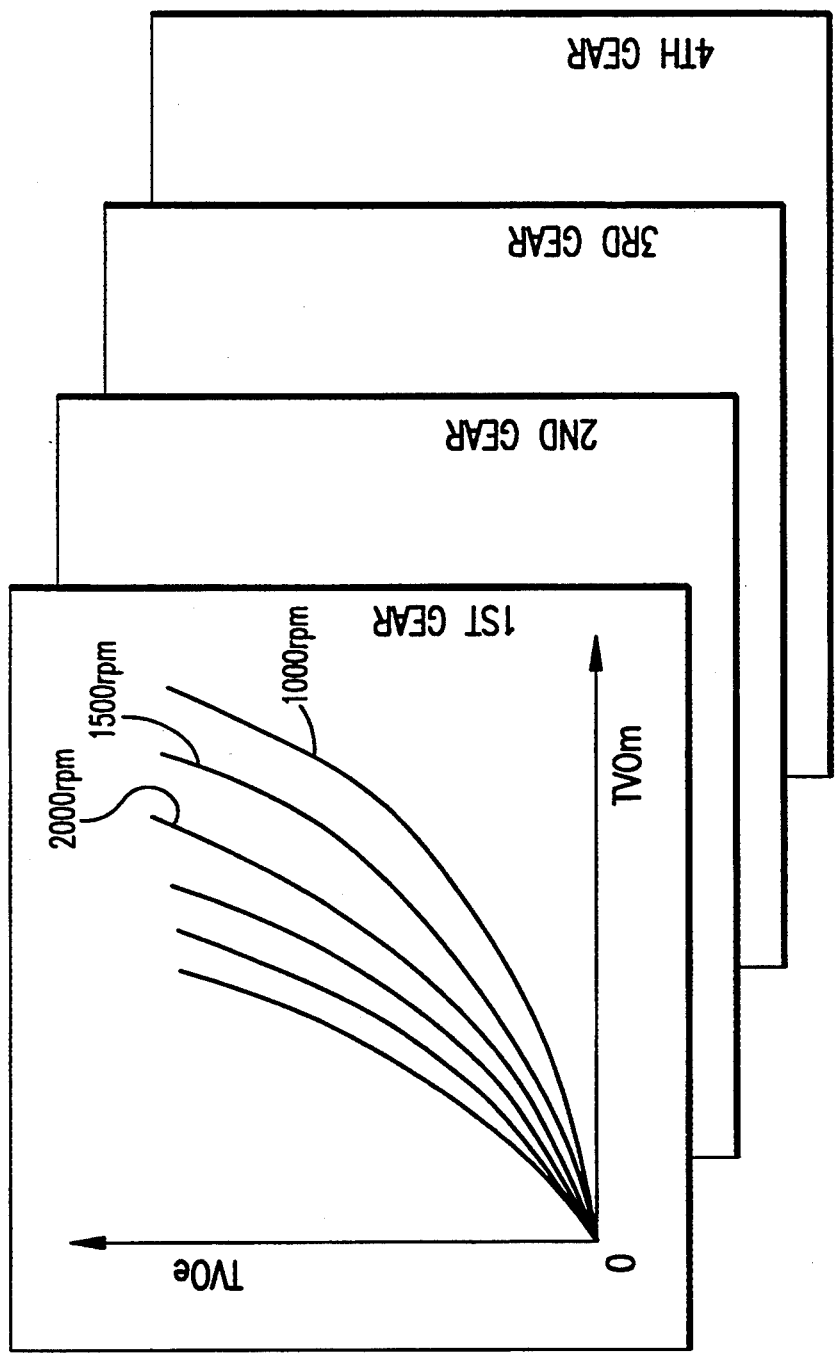
FIG. 4A is an illustration of electric throttle opening control maps for various gears of an automatic transmission.
Figure 5A:
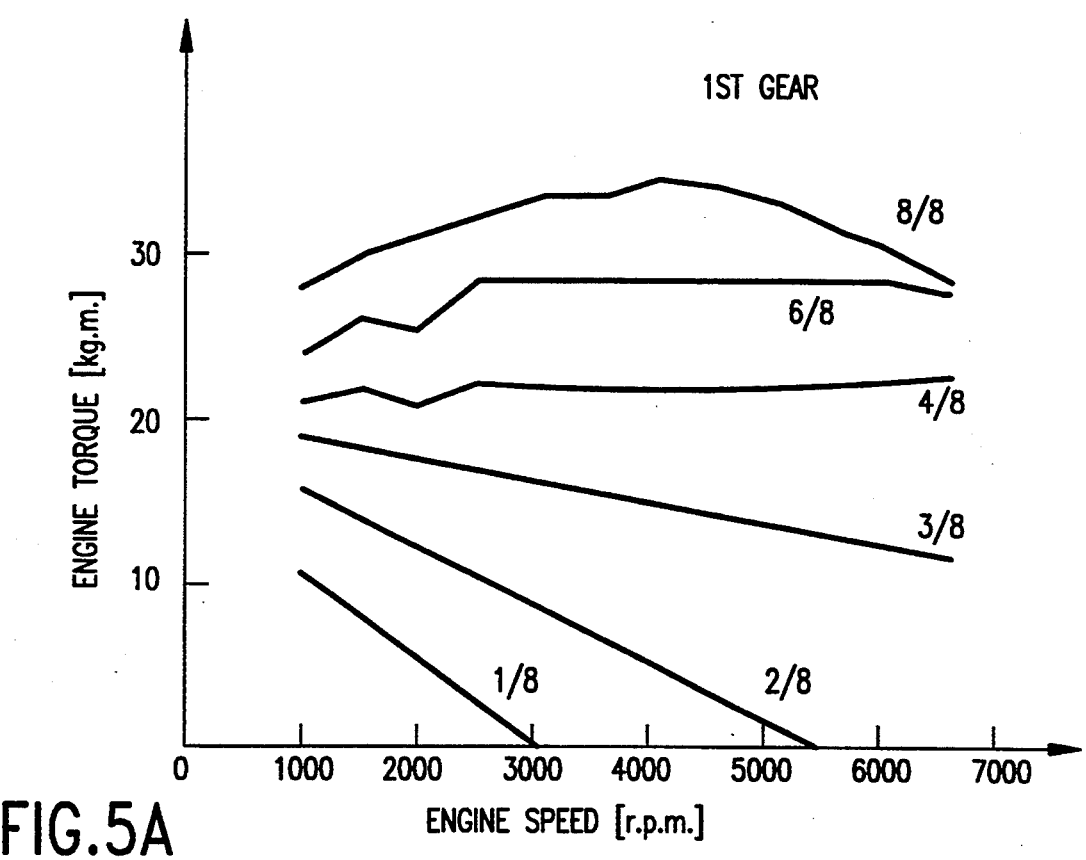
FIGS. 5A to 5D are diagrams showing engine output torque in terms of engine speed and electric throttle opening for each gear of the automatic transmission.
Figure 5B:
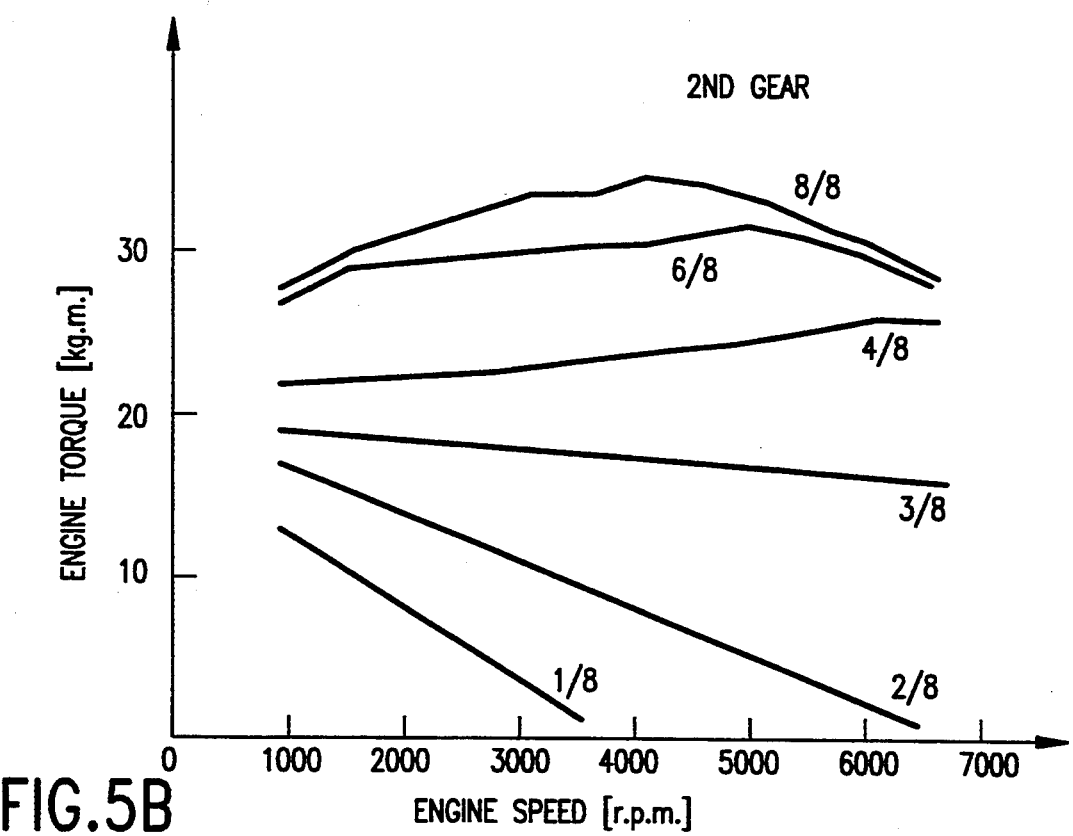
Figure 5C:
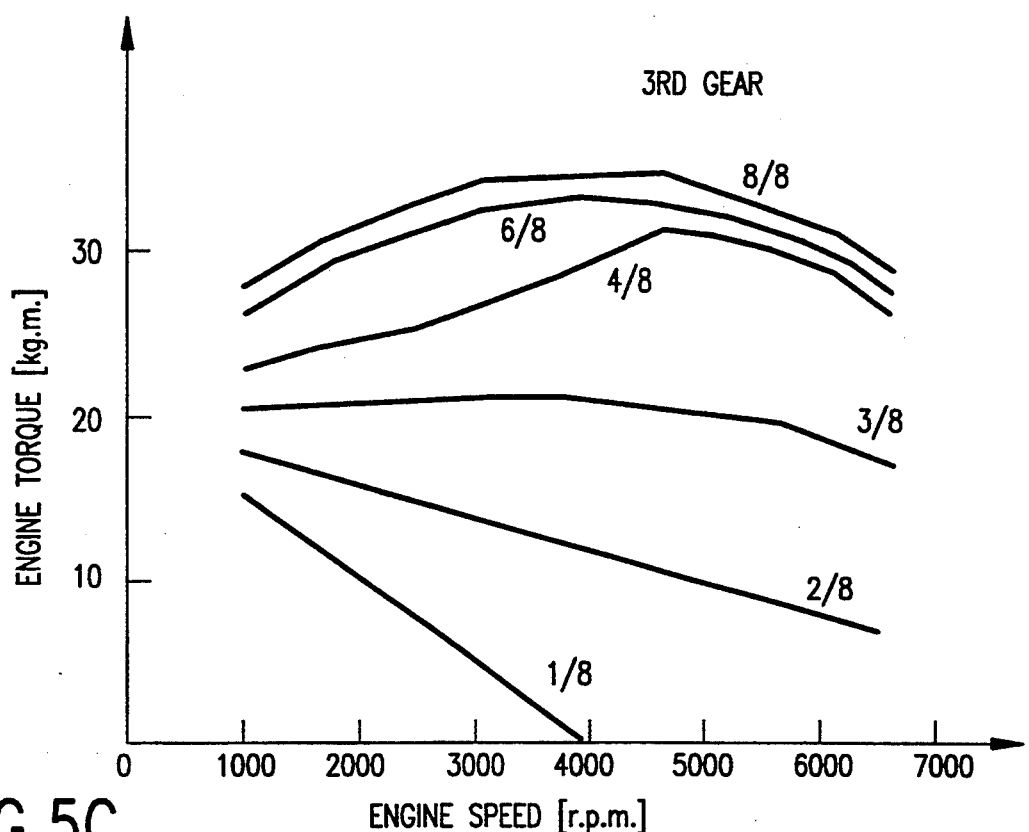
Figure 5D:
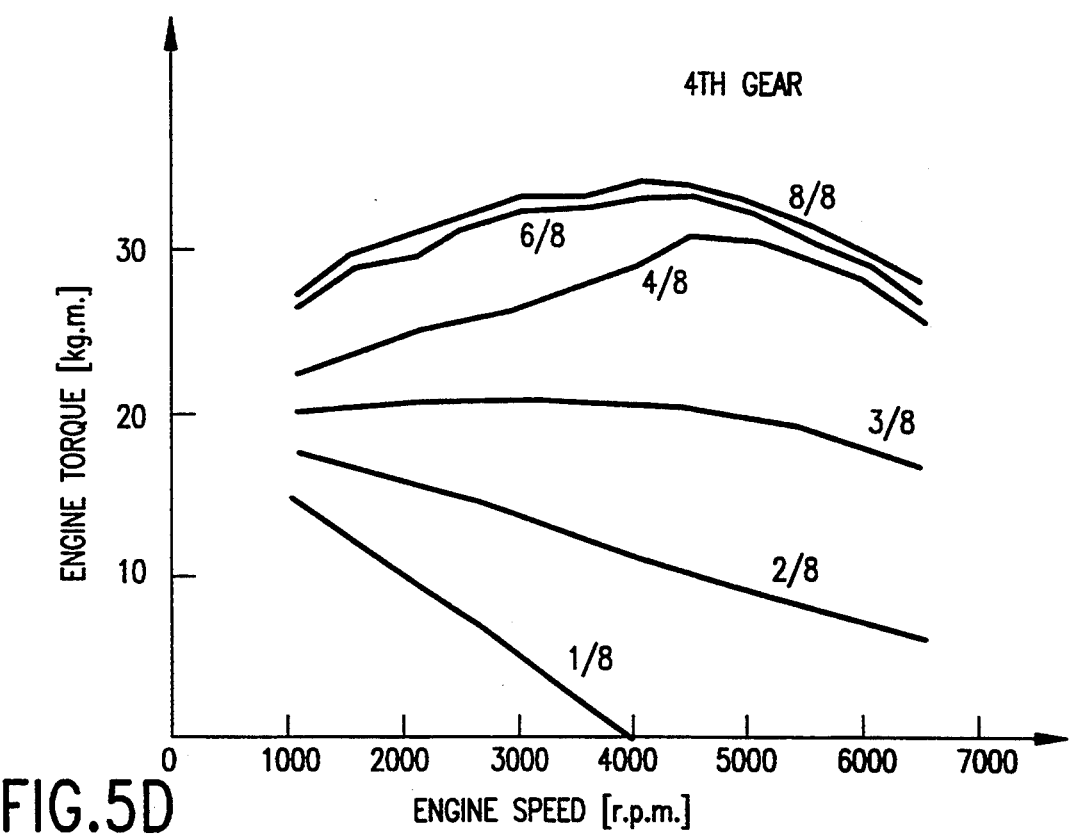

Throttle opening control for the electric throttle valve 20 is performed based on throttle opening control patterns or lines provided in the form of a map for each gear of the automatic transmission 2 as shown in FIG. 4A. Each throttle opening control (TOC) map, stored in a read only memory in the engine control unit U1, establishes a group of throttle opening control lines, in terms of mechanical throttle opening (TVOm) and electric throttle opening (TVOe), for various speeds. Mechanical throttle openings represent displacements of the accelerator pedal 16, and engine speeds represent output torques of the engine 1. The mechanical throttle valve is designed and adapted so that as the gear to which the automatic transmission has been shifted gets higher, the opening of the mechanical throttle valve becomes larger. This increases the engine output torque.

Output torque characteristics of the engine are defined relative to engine speed with respect to mechanical throttle openings for the possible gears of the automatic transmission. Such gears may, for instance, be first to fourth gears, as shown in FIG. 5A through 5D. As an example, the engine output torque may be 10.0 kgm, 13.0 kgm, 14.0 kgm and 15 kgm for the first gear, the second gear, the third gear and the fourth gear, respectively, when the mechanical throttle valve is at a ⅛ opening and the engine operates at a speed of 1,000 rpm.

Transmission shift control for the automatic transmission 2 is performed by the transmission control unit U2. This control is based, in addition to various signals sent to the transmission control unit U2 and from the engine control unit U1, on a line pressure control pattern or line defined in terms of line pressure (LP) and throttle opening (TVO) so as to provide, in a hydraulic pressure control circuit (not shown), a desired line pressure for selectively causing frictional clutch elements to shift the automatic transmission into a desired gear as shown in FIG. 4B. For controlling a throttle opening, the smaller of the electric throttle opening and the mechanical throttle opening is selected for each operating condition. In addition to the throttle opening control, the transmission control unit U2 determines a time at which the output torque of the engine is lowered and provides a torque-down demand signal having a certain duration to the engine control unit U1. It is to be noted that a transmission shift operation is performed based on a shift control map defined by turbine or vehicle speeds and mechanical throttle openings in a well known manner.

In order to prevent the occurrence of shift shocks during shifting of the automatic transmission 2, during a torque-down demand signal, the engine control unit U1 causes the engine 1 to decrease its output torque. Simultaneously, during the torque-down demand signal, the transmission control unit U2 retrieves an electric throttle opening control (TOC) map for a desired gear in place of that for the undertaking gear. More particularly, in order to decrease an uncomfortable physical feeling due to a change in power train output, resulting from the replacement of an electric throttle opening control (TOC) map, and prevent the occurrence of shift shocks during up-shifting of the automatic transmission 2, when there is a change in a shift signal for shifting from a lower gear to an upper gear, the transmission control unit U2 holds the electric throttle opening to temporarily suspend the throttle opening control of the electric throttle valve 20. The throttle opening control is resumed once the torque-down demand signal disappears so as to replace an electric throttle opening control (TOC) map.

Figure 6:
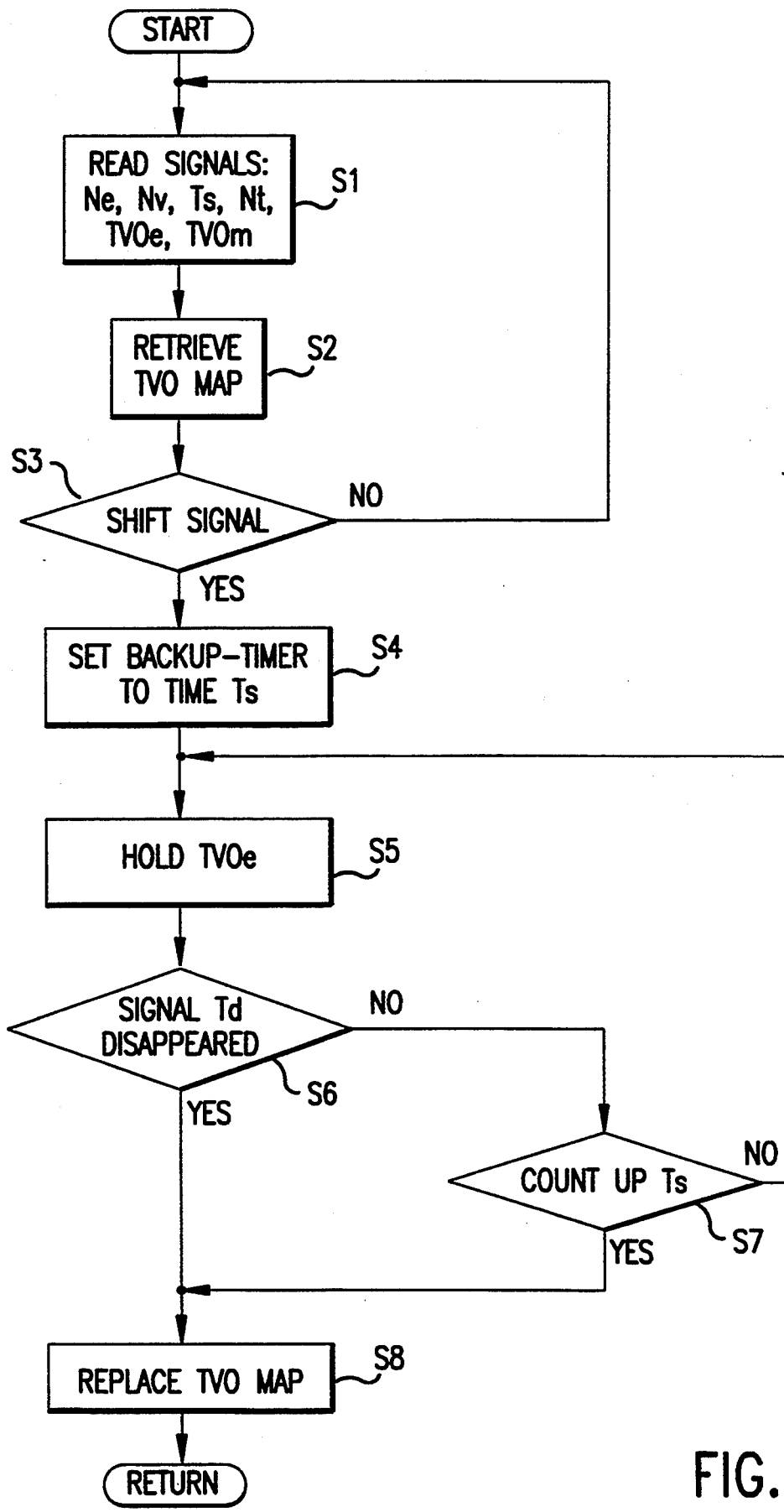
FIG. 6 is a flow chart illustrating an up-shift electric throttle opening control routine for a microcomputer of the control system.
Figure 7A:
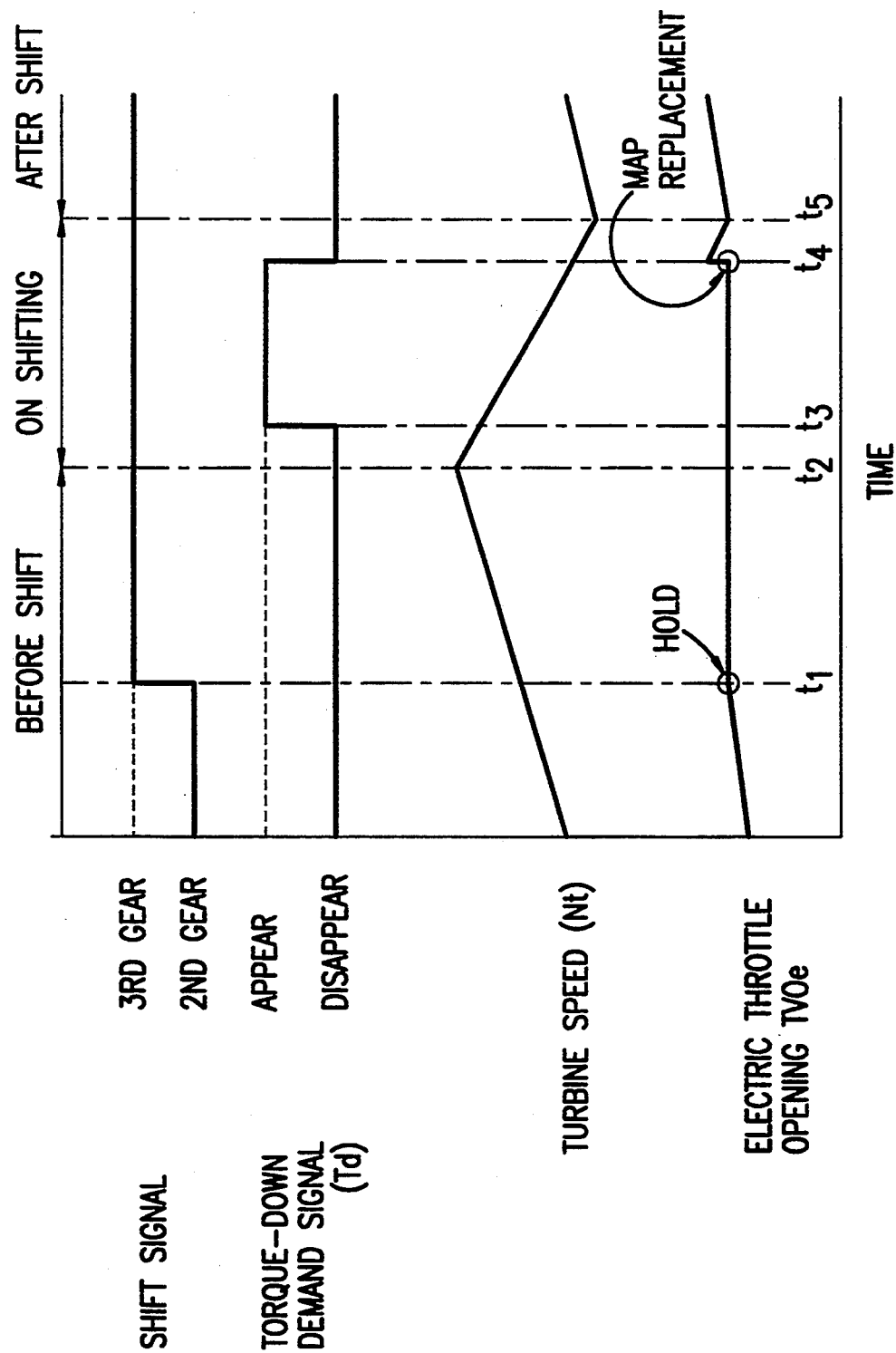
FIG. 7A is a time chart of up-shift electric throttle opening control in which "engine torque-down" is introduced.
Figure 8:
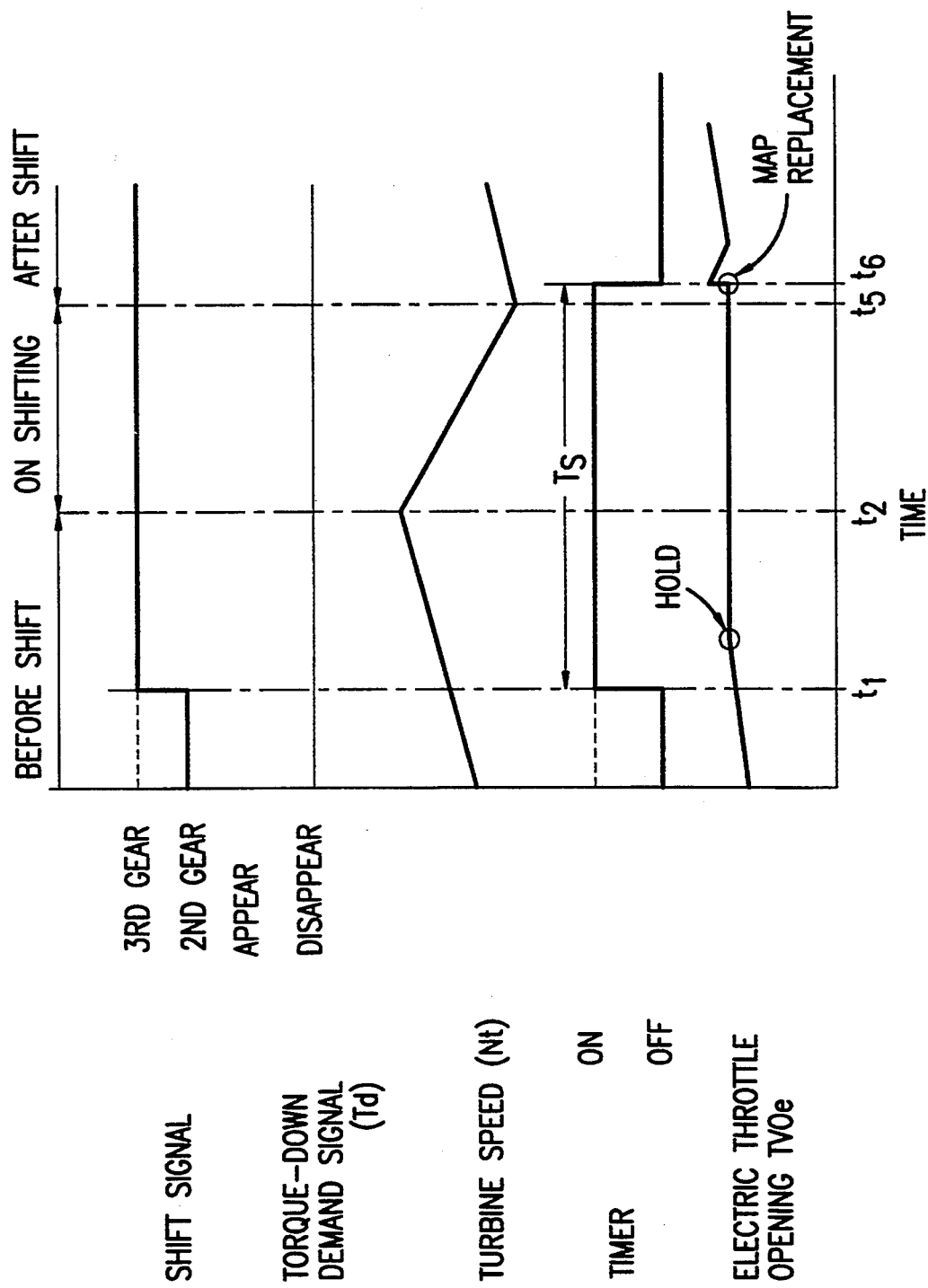
FIG. 8 is a time chart of an up-shift electric throttle opening control in which no engine torque-down is introduced.

The operation of the engine control system depicted in FIG. 2 will be best understood by reviewing FIG. 6, which is a flow chart illustrating an up-shift electric throttle opening control routine for the microcomputer of the control unit U, in conjunction with FIGS. 7A and 8, which are time charts of the electric throttle opening control. Programming a computer is a skill well understood in the art. The following description is written to enable a programmer having ordinary skill in the art to prepare an appropriate program for the microcomputer. The particular details of any such program would, of course, depend upon the architecture of the particular computer selected.

Referring to FIG. 6, the first step at step S1 is to read control factors in the form of electric signals which represent an engine speed (Ne), a present or "undertaking" gear (Ts), a turbine speed (Nt) and a mechanical throttle opening (TVOm). Based on the engine speed (Ne) and the mechanical throttle opening (TVOm), at step S2, a throttle opening control (TVO) map for the undertaking gear (Ts), for instance, second gear, is retrieved in order to determine a desired electric throttle opening (TVOe). Then, a decision is made at step S3 as to whether or not there is a change in a shift signal for shifting from the second gear to the third gear at a time t1. The answer to this decision indicates whether or not an upshift demand for shifting the automatic transmission from the second gear to a third gear is present. If the answer to the decision made at step S3 is "YES" at the time t1, then, simultaneously with or immediately after setting a back-up timer to a back-up time Ts at step S4, the electric throttle opening (TVOe) at the time t1 is held or kept on at step S5.

At a time t4, after the appearance of the 2–3 change shift signal at the time t1, the turbine speed (Nt) begins to slow down linearly. At a time t3, the turbine speed (Nt) slows down at a predetermined rate, and the transmission control unit U2 provides a torque-down demand signal Td to the engine control unit U1. The reason for this is that although the time at which the output torque of the engine 1 lowers down is determined by the transmission control unit U2 because a shift control of the automatic transmission 2 is performed by the transmission control unit U2, the torque down control is performed by retarding ignition of the engine by the engine control unit U1. As soon as the engine control unit U1 receives the torque-down demand signal Td, it retards ignition of the engine by a predetermined time so as to lower the engine output torque, thereby preventing the occurrence of a jolt or shift shock. Near the completion of the intended shift of the automatic transmission 2, i.e., at a time t4, the turbine speed (Nt) reaches a speed which is higher by a predetermined rate than a target turbine speed at the completion of the intended shift of the automatic transmission 2. The torque-down demand signal Td is then removed and disappears.

Figure 9A:
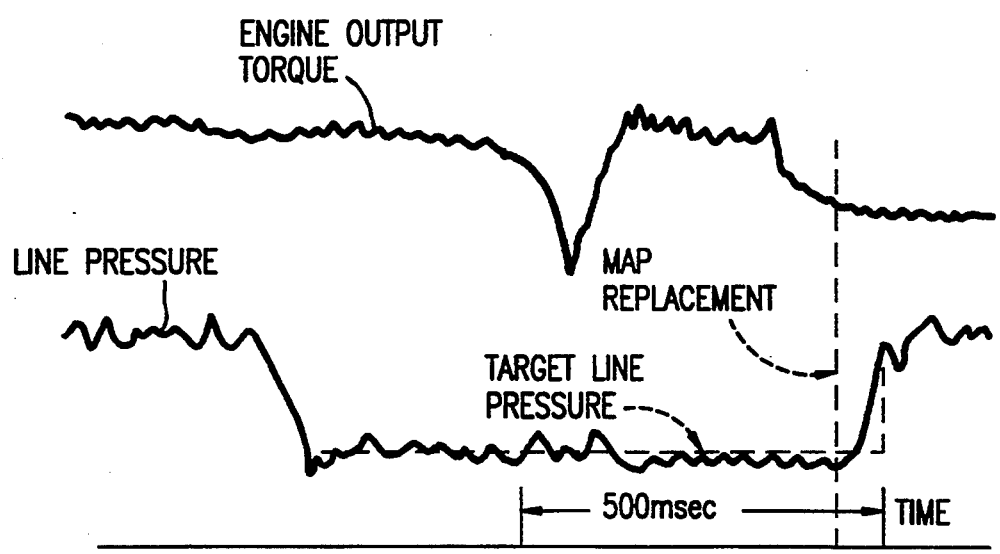
FIG. 9A shows shift characteristics according to the control corresponding to the time chart of FIG. 7A.

After holding the electric throttle opening (TVOe) on, a decision is made at step S6 as to whether or not the torque-down demand signal Td has disappeared. As long as the torque-down demand signal Td is continuously detected, or until the answer to the decision made at step S6 becomes "Yes," another decision is made at step S7 as to whether or not the back-up timer has counted down the back-up time Ts. If the answer to the decision made at step S7 is "NO," then, the electric throttle opening (TVOe) at the time t1 is kept or held as step S5 is repeated. On the other hand, if the torque-down demand signal Td is detected to have disappeared at the time t4 or if the back-up timer has counted down the back-up time Ts while the torque-down demand signal Td has not yet been detected to have disappeared, then, at step S8, after releasing the desired electric throttle opening (TVOe), the electric throttle opening map is changed from that appropriate for the second gear to that appropriate for the third gear at the time t4. At the time t4, since the speed of the engine 1 has been lowered sufficiently, the electric throttle valve 20 shows only a very small change in opening. As is apparent from FIG. 8, the reason for counting down the back-up time Ts is that a torque-down demand signal possibly will not disappear. If in fact a torque-down demand signal is detected and has not disappeared, it is necessary to forcibly change an electric throttle opening map from that appropriate for the second gear to that appropriate for the third gear after the back-up time Ts has elapsed at a time FIG. 9A shows changes in engine torque and transmission control hydraulic pressure during replacement of an electric throttle opening control (TOC) map from that appropriate for the second gear that appropriate to for the third gear based on the detection of a disappearance of a torque-down demand signal and the elapse of a back-up time. As shown in FIG. 9A, since no replacement of an electric throttle opening control (TOC) map takes place during an up-shift of the automatic transmission 2 from the second gear to the third gear, it is apparent that the engine output torque does not include any "protuberance", i.e., is not varied significantly, before the up-shift. Also, the transmission control hydraulic pressure is kept almost equal to a target transmission control hydraulic pressure during an up-shift. This indicates that shifting is performed substantially free from shift shocks and, therefore, approximately ideally.

Figure 7B:
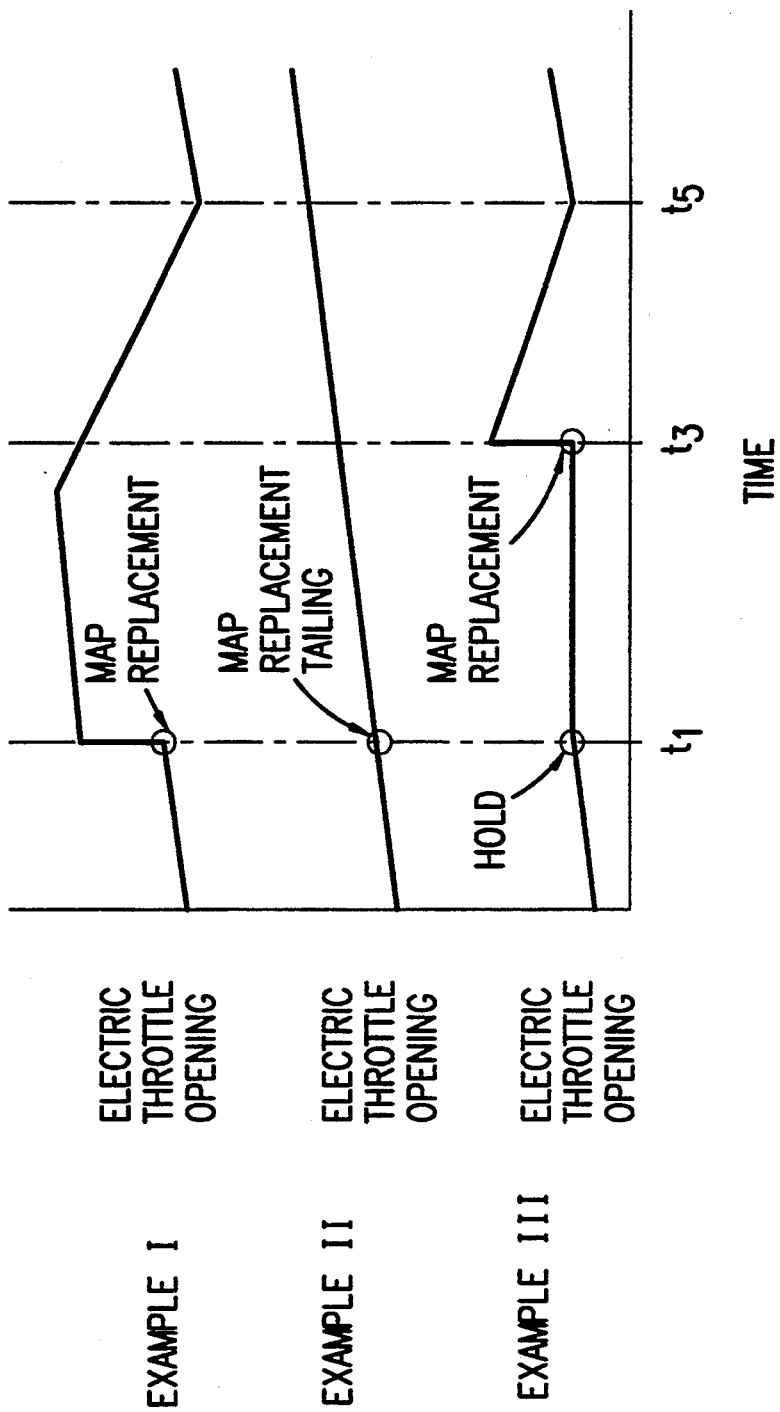
FIG. 7B shows time charts of known electric throttle opening controls.
Figure 9B:
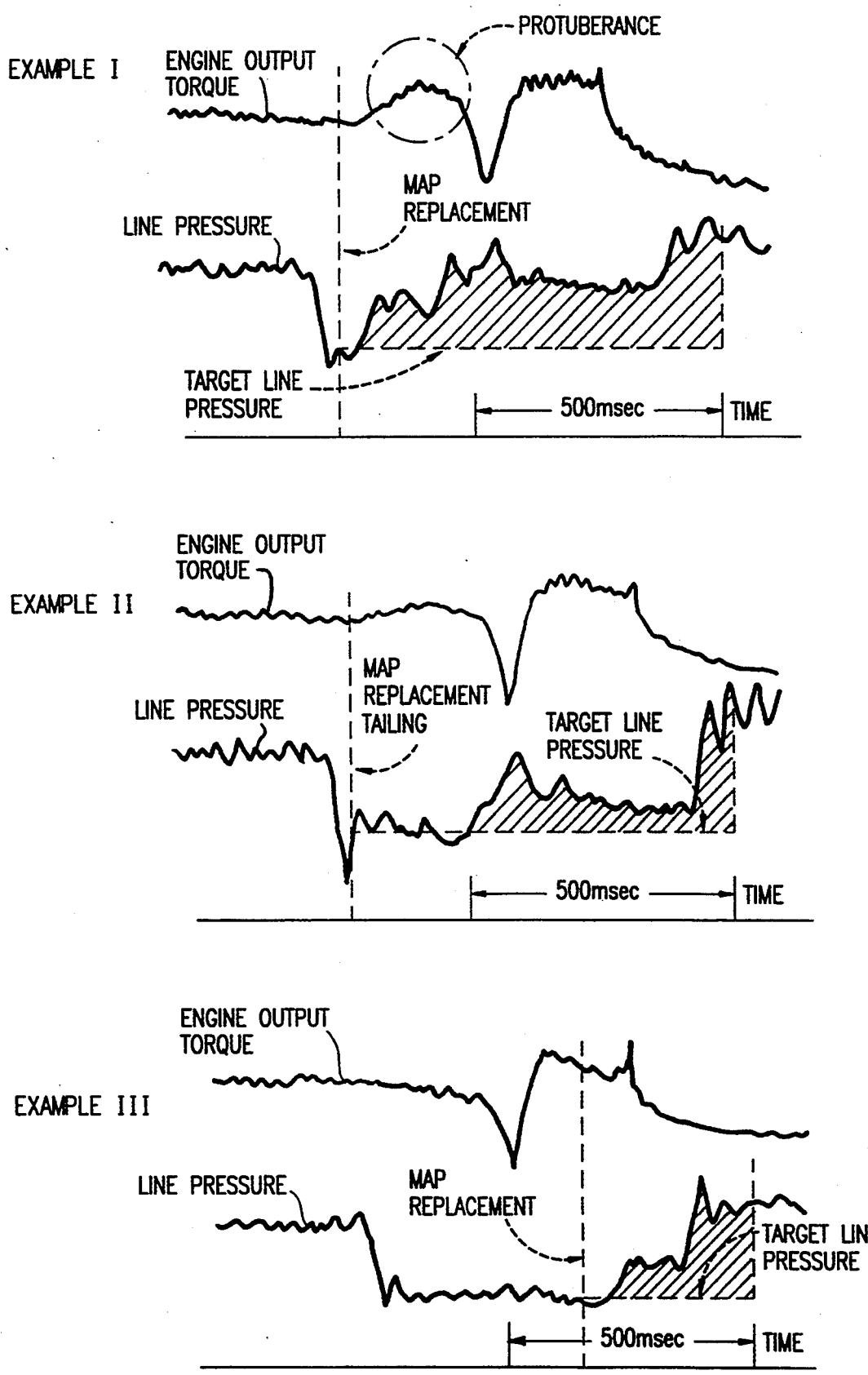
FIG. 9B shows shift characteristics controls corresponding to the time charts of FIG. 7B, respectively.

The electric throttle opening control by map replacement, such as that taking place during an up-shift of the automatic transmission of this embodiment as shown in FIG. 7A and 9A, compares favorably with the various electric throttle opening controls shown in FIGS. 7B and 9B. That is, in Example I, shown as a conventional electric throttle opening control, when replacement of an electric throttle opening control (TOC) map takes place at the time t1 that a shift signal for the second gear is changed to a shift-signal for the third gear, the opening of an electric throttle valve changes greatly from the time t1 and generates a protuberance in the engine output torque before the up-shift. In addition, during the up-shift, the opening of the electric throttle valve decreases with a change in engine speed. Consequently, the transmission control hydraulic pressure changes and fluctuates widely from a target transmission control hydraulic pressure during the up-shift, as indicated by the shaded area in FIG. 9B. This leads to a deterioration in shifting quality.

Example II shows a tailing control of electric throttle opening control in which a gentle, continuous change in electric throttle opening to a target electric throttle opening is conducted. If, in addition to the electric throttle opening control (TOC) map replacement, an electric throttle opening control is performed by such a tailing electric throttle opening control so as to prevent the occurrence of a rapid change in electric throttle opening, although generation of a protuberance in the engine output torque before the up-shift can be eliminated, the transmission control hydraulic pressure changes and fluctuates widely from a target transmission control hydraulic pressure during the up-shift. Such is indicated by the shaded area in FIG. 9B. Because the electric throttle opening control (TOC) map replacement is conducted for down-shifts from one gear to another as well as up-shifts, if the tailing electric throttle opening control is conducted, in addition to the electric throttle opening control (TOC) map replacement for down-shifting, the electric throttle valve is disabled from responding to a rapid torque down demand upon down-shifting, even though a deterioration in shifting properties is allowed.

Example III shows another conventional electric throttle opening control. In this control, although an electric throttle opening is kept on at the time t1 at which a shift signal change is caused, the electric throttle opening control (TOC) map replacement is conducted at the time t3 at which a torque-down demand signal arises. In Example III, therefore, after the completion of shifting, great changes in engine output torque and transmission control hydraulic pressure are caused, due to the changes in electric throttle opening.

As is apparent from a comparison between the present invention and the prior art, the shifting properties of the engine control of the present invention, in which the electric throttle opening control (TOC) map is replaced at the time t4 of the disappearance of a torque-down demand signal simultaneously with holding on of an electric throttle valve opening at the shift signal change as shown in FIG. 7A, compare very favorably with any of the prior art controls. Replacing of electric throttle opening control maps is available for down-shifting with favorable results.

As previously discussed, in the control system for a power plant, including an engine equipped with an automatic transmission, in which throttle opening characteristics are changed corresponding to gears of the automatic transmission, output torque of the power train plummets due to changes in throttle opening characteristics upon a down-shift. This is referred to as a shift-down output torque drop. In order for the power plant to avoid such a shift-down output torque drop, an improved engine control system may be provided in accordance with another preferred embodiment of the present invention.

Figure 10:
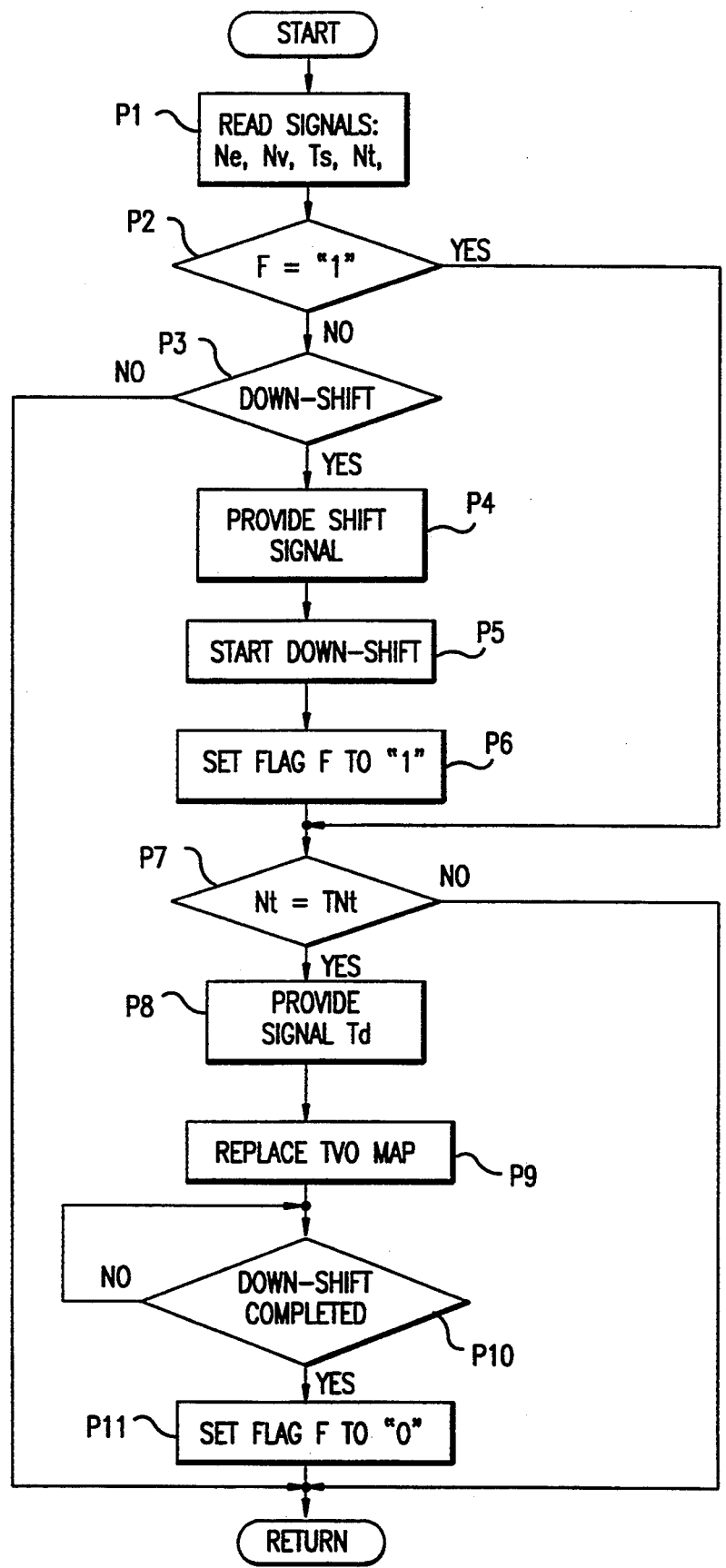
FIG. 10 is a flow chart illustrating a down-shift electric throttle opening control routine for a microcomputer of the control system.

Referring to FIG. 10, which is a flow chart illustrating a down-shift electric throttle opening control routine for the microcomputer of the control unit U, after reading driving conditions as control factors in the form of electric signals which represent an engine speed (Ne), a present or "undertaking" gear (Ts), a turbine speed (Nt), and a mechanical throttle opening (TVOm), at step P1, a decision is made at step P2 as to whether or not a down-shift flag F has been set, in the preceding sequence, to a state of "1." It is to be noted that the down-shift flag F is set to "1" at the beginning of a desired down-shift of the automatic transmission 2 and to "0" at the completion of the desired down-shift of the automatic transmission 2. If the answer to the decision made at step P2 is "YES," this indicates that a down-shift of the automatic transmission 2 is in progress. Then, another decision concerning the turbine speed (Nt) is made at step P7 in order to continue the down-shift electric throttle opening control. However, if the answer to the decision made at step P2 concerning down-shift is " NO," then, a decision is made, based on the driving condition, at step P3. In step P3, it is decided whether or not there is a demand for a down-shift of the automatic transmission 2. In other words, in step P3, it is decided whether or not a desired or target gear of the automatic transmission 2 for the driving condition is at a lower gear side than the undertaking gear (Ts). This decision is carried out by referring to shift control lines for the possible gears, such as the first to fourth gears, defined in terms of vehicle speed and mechanical throttle opening in a well known manner. If the answer to the decision made in step P3 is " NO," this indicates that the automatic transmission should remain in the present or undertaking gear (Ts). A return is then ordered.

Figure 11:
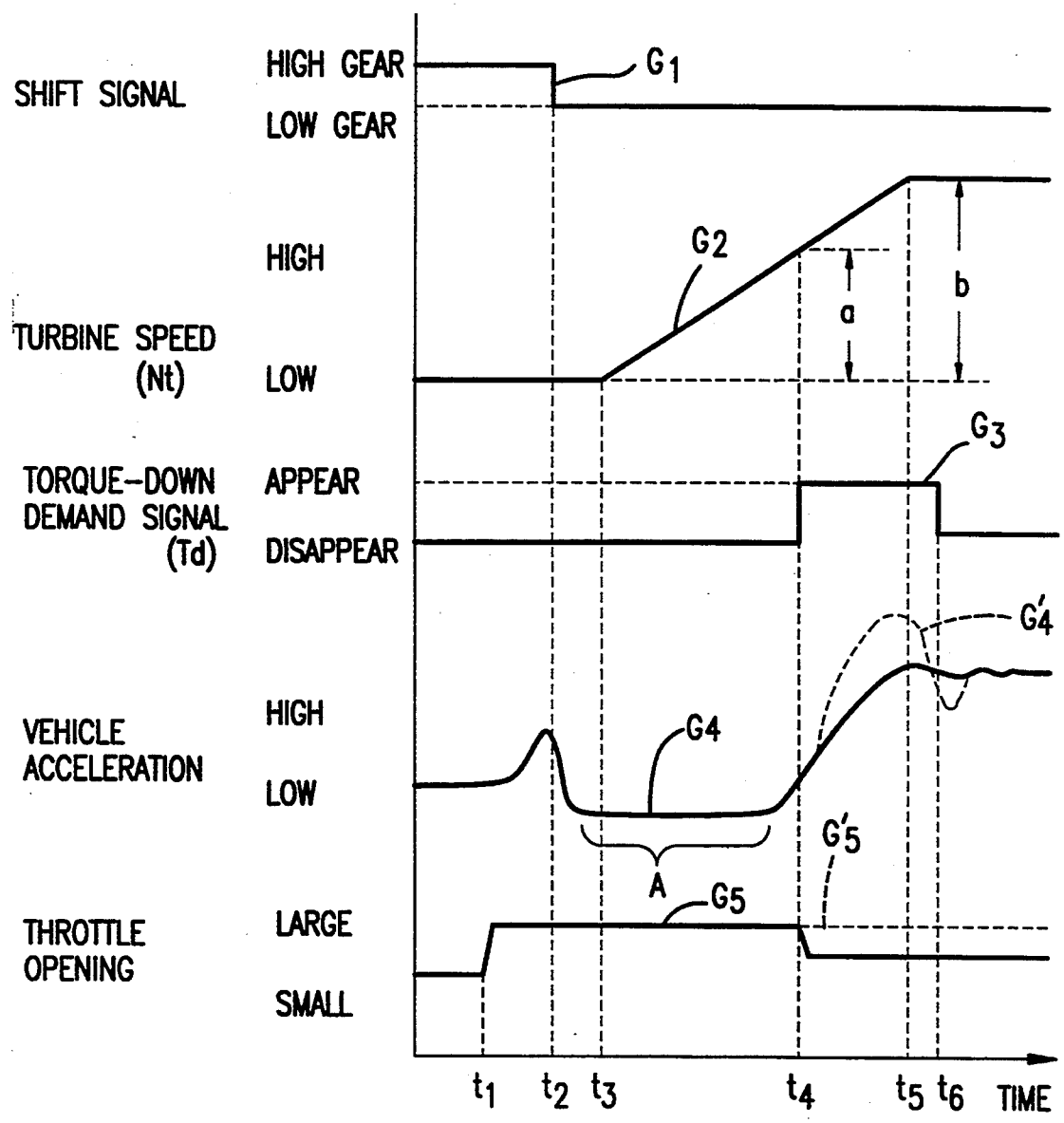
FIG. 11 a time chart of a down-shift electric throttle opening control.

If the answer to the decision concerning a shift-down demand is "YES," after providing a down-shift signal at step P4 so as to actually start desired down-shifting of the automatic transmission 2 at step P5, the down-shift flag F is set to "1" at step P6. For example, as shown in FIG. 11, if the accelerator pedal 16 is depressed for acceleration at a time t1, both the mechanical throttle valve 18 and the electric throttle valve 20 open (line "G5") at the time t1. This causes the output torque of the engine 1 to increase. As the output torque of the engine 1 increases, a vehicle acceleration (line "G4") rises. When the automatic transmission 2 commences a gear shift upon the appearance of a shift signal (line "G1") at a time t2, the automatic transmission 2 temporarily renders its shift gear mechanism idle. Accordingly, the automatic transmission 2 temporarily reduces engine torque and transmits the reduced engine torque to driving wheels. Otherwise, the automatic transmission 2 temporarily disconnects transfer of engine torque to the driving wheels, so that the vehicle acceleration plummets. This rapid drop in vehicle acceleration causes the vehicle to be in an acceleration slump A. At a time t3, a short time after the time t2 at which the rapid drop in vehicle acceleration is caused, the automatic transmission 2 begins to increase its turbine speed.

After setting the down-shift flag F to "1" at step P6, and if the answer to the decision made at step P2 concerning the down-shift flag F is "YES", a decision is made at step P7 as to whether or not the turbine speed (Nt) has increased and reached a target turbine speed (TNt) which allows the engine to lower its output torque. As is shown in FIG. 11, the target turbine speed (TNt) is established so as to obtain a predetermined ratio of the speed difference a between a current turbine speed and a turbine speed at the beginning of down-shift to the speed difference b between the turbine speed at the beginning of a down-shift and a specific turbine speed (which is referred to as an anticipated turbine speed) which the turbine is anticipated to reach at the completion of the down-shift. The anticipated turbine speed is determined in a well known manner based on a specific gear, which it is desired to have the automatic transmission 2 shift down to, and a vehicle speed. The reason for making the decision concerning the anticipated turbine speed at step P7 is to perform an electric throttle opening control (TOC) map replacement which is not accompanied by a jolt or shift shock. Such a jolt or shaft shock may be caused due to a rapid change in power train when frictional elements, such as clutches and brakes, of the automatic transmission are locked and unlocked and the engine 1 provides a high output torque during a down-shift. In order to prevent a jolt or a shift shock from occurring, the control system executes an electric throttle opening control (TOC) map replacement in steps P8 to P10 so as to cause the engine 1 to begin lowering its output torque at a proper timing. That is, if the answer to the decision made at step P7 is "YES," this indicates that the anticipated turbine speed has been reached. Then, the transmission control unit U2 provides a torque-down demand signal Td to the engine control unit U1 at step P8.

As soon as the engine control unit U1 receives the torque-down demand signal Td, it retards ignition of the engine 1 by a predetermined time so as to lower the engine output torque. A jolt or a shift shock is thereby prevented. Simultaneously, in the presence of the torque-down demand signal, the transmission control unit U2 retrieves an electric throttle opening control (TOC) map for a desired gear in place of the undertaking gear at step P9. As the gear to which the automatic transmission has been shifted gets lower, the opening of the mechanical throttle valve becomes smaller so as to lower the engine output torque. Consequently, the replacement of the electric throttle opening control (TOC) map causes the output torque of the engine 1 to be lowered. If the torque-down demand signal Td (line "G3") is provided at, for instance, a time t4 as a result of the turbine speed (Nt) having reached the anticipated turbine speed as shown in FIG. 11, the opening (TVOe) of the electric throttle valve 20 is made small, so that the output torque of engine 1 is lowered. Because the opening of the mechanical throttle valve 20 changes so as to correspond to displacement of the accelerator pedal 16, its opening does not change (line "G5"), even in the presence of the torque-down demand signal Td.

As was previously described, a rapid rise in torque to be transmitted to the driving wheels, which causes a rapid rise in acceleration ("G4"), may be caused around the time t4 at which the turbine speed reaches the target turbine speed (TNt). Consequently, the ignition is retarded so as to lower the engine output torque, thereby eliminating a jolt. However, retardation of ignition must be kept within specific limits for appropriate emission control. Therefore, simply lowering the engine output torque by retarding ignition can not always perfectly suppress a rapid rise of acceleration. The control system of the present invention, however, replaces one electronic throttle opening map with another simultaneously with lowering of engine output torque. As a result, engine output torque is properly lowered. This suppresses almost perfectly a rapid rise in acceleration and, accordingly, prevents the vehicle from being subjected to jolts and shift shocks. As shown in FIG. 11, at a time t6, shortly after the turbine speed has reached the target turbine speed (TNt) at a time t5, the torque-down demand signal Td disappears.

Finally, at step P10, a decision is made as to whether or not the intended down-shift of the automatic transmission is completed. This decision is made based on whether or not the torque-down demand signal Td has disappeared, and is repeated until the torque-down demand signal Td disappears. When the torque-down demand signal Td disappears and the answer to the decision made at step P10 becomes "YES," the down-shift flag F is reset to "0" at step P11. The final step of the routine orders a return to the first step of the routine.

If the answer to the decision made concerning the target turbine speed (TNt) at step P7 is " NO," a return to the first step of the routine is ordered without taking the steps P8 through P11 which follow.

It is to be understood that although the present invention has been described with respect to a preferred embodiment thereof, various other embodiments and variants may occur to those skilled in the art. Any such other embodiments and variants are intended to be covered by the following claims.

What is claimed is:

1. A control system for a power plant of an automotive vehicle, including an engine equipped with an automatic transmission, comprising:
   first output torque control means for mechanically controlling output torque of said engine;
   second output torque control means for performing a control of output torque of said engine according to signals generated by control patterns based on said first output torque control means and engine speeds, said control patterns being predetermined for possible gears of said automatic transmission; and
   control means for interrupting said control of said second output torque control means which is based on said control pattern corresponding to a desired gear during a shift operation of said automatic transmission to said desired gear, said desired gear being one of said possible gears to which said automatic transmission is shifted.

2. A control system as defined in claim 1, wherein said second output torque control means comprises throttle means for performing a control of intake air introduction into said engine according to the control patterns which are predetermined for the possible gears of said automatic transmission.

3. A control system as defined in claim 2, wherein said throttle means comprises an electrically operated throttle valve having an opening which is controlled to vary the quantity of intake air introduced into said engine according to said control patterns.

4. A control system as defined in claim 2, and further comprising third output torque control means for causing said engine to produce a drop in output torque during said shift operation.

5. A control system as defined in claim 4, wherein said third output torque control means causes said engine to commence said drop in output torque when an input speed of said automatic transmission slows down at a predetermined rate at the beginning of said shift operation and to terminate said drop in output torque at the end of said shift operation.

6. A control system as defined in claim 5, wherein said second output torque control means releases interruption of said control of intake air introduction when said drop in output torque is terminated.

7. A control system for a power plant of an automotive vehicle, including an engine equipped with an automatic transmission, comprising:
   first output torque control means for mechanically controlling output torque of said engine;
   second output torque control means for performing a control of output torque of said engine according to signals generated by control patterns based on said first output torque control means and engine speeds, said control patterns being predetermined for possible gears of said automatic transmission; and
   control means for forcing said second output torque control means to provide a drop of output torque of said engine during a down-shift operation of said automatic transmission and permitting said second output torque control means to perform said control of output torque according to a control pattern corresponding to a desired gear of said possible gears to which said automatic transmission is shifted during a shift operation of said automatic transmission at a beginning of said drop of output torque of said engine.

8. A control system as defined in claim 7, wherein said control patterns specify a lower output torque of said engine for a lower gear of said possible gears than for a higher gear of said possible gears.

9. A control system as defined in claim 8, wherein said second output torque control means comprises a throttle means for performing a control of intake air introduction into said engine according to said control patterns which are predetermined for possible gears of said automatic transmission.

10. A control system as defined in claim 9, wherein said throttle means comprises an electrically operated throttle valve having an opening which is controlled to vary the quantity of intake air introduced into said engine according to said control patterns.

11. A control system as defined in claim 1, wherein said second output torque control means controls said output torque of said engine so that it becomes higher as a gear to which said automatic transmission is shifted becomes higher.

12. A control system as defined in claim 7 wherein said second output torque control means controls said output torque of said engine so that it becomes higher as a gear to which said automatic transmission is shifted becomes higher.

13. A control system for a power plant of an automotive vehicle, including an engine equipped with an automatic transmission, comprising:
   an accelerator pedal;
   output torque control means for performing a control of output torque of said engine according to signals generated according to control patterns based on a displacement of said accelerator pedal and an engine speed, said control patterns being predetermined for possible gears of said automatic transmission; and
   control means for interrupting said control of said output torque control means which is based on a control pattern corresponding to a desired gear during a shift operation of said automatic transmission to said desired gear, said desired gear being one of said possible gears of said automatic transmission.

14. A control system for a power plant of an automotive vehicle, including an engine equipped with an automatic transmission, comprising:
   an accelerator pedal;
   first output torque control means for performing a control of output torque of said engine according to signals generated according to control patterns based on a displacement of said accelerator pedal and an engine speed, said control patterns being predetermined for possible gears of said automatic transmission;
   second output torque control means for suppressing said output torque of said engine during a shift operation of said automatic transmission; and
   control means for forcing said second output control means to provide a drop of output torque of said engine during a down-shift operation of said automatic transmission and permitting said first output torque control means to perform said control of output torque according to a control pattern corresponding to a desired gear of said possible gears to which said automatic transmission is shifted during a shift operation of said automatic transmission at a beginning of said drop of output torque of said engine.

* * * * *